(12) United States Patent
Li et al.

(10) Patent No.: US 11,633,329 B2
(45) Date of Patent: Apr. 25, 2023

(54) FEEDING SYSTEM FOR TREATING LIQUID MEDICAL WASTE

(71) Applicant: AMSINO MEDICAL (SHANGHAI) CO., LTD., Shanghai (CN)

(72) Inventors: Zhongze Li, Shanghai (CN); Richard Lee, Pomona, CA (US)

(73) Assignee: AMSINO MEDICAL (SHANGHA) CO., LTD., Shanghai (CN)

( * ) Notice: Subject to any disclaimer, the term of this patent is extended or adjusted under 35 U.S.C. 154(b) by 0 days.

(21) Appl. No.: 17/383,655

(22) Filed: Jul. 23, 2021

(65) Prior Publication Data

US 2021/0393483 A1 Dec. 23, 2021

Related U.S. Application Data

(63) Continuation-in-part of application No. 16/339,230, filed as application No. PCT/CN2017/113469 on Nov. 29, 2017, now abandoned.

(30) Foreign Application Priority Data

Sep. 15, 2017 (CN) .......................... 201721210075.8

(51) Int. Cl.
*A61J 1/20* (2006.01)
*B09B 3/00* (2022.01)

(52) U.S. Cl.
CPC ............. *A61J 1/2048* (2015.05); *A61J 1/201* (2015.05); *B09B 3/0075* (2013.01)

(58) Field of Classification Search
CPC .. A47J 31/3628; A47J 31/3633; A47J 31/407; A47J 1/1412; A47J 1/1437;
(Continued)

(56) References Cited

U.S. PATENT DOCUMENTS 3,391,951 A * 7/1968 Miller ................... F16L 29/005
137/68.29
4,573,506 A 3/1986 Paoletti
(Continued)

FOREIGN PATENT DOCUMENTS

CN 103538785 B 7/2015
CN 105645486 A 6/2016
(Continued)

OTHER PUBLICATIONS

International Search Report and Partial Translation thereof dated Jun. 7, 2018 in counterpart International Application No. PCT/CN2017/113469, 9 pp.
(Continued)

*Primary Examiner* — Timothy P. Kelly
*Assistant Examiner* — Christopher M Afful
(74) *Attorney, Agent, or Firm* — Shumaker & Sieffert, P.A.

(57) ABSTRACT

The present disclosure discloses a feeding system for treating liquid medical waste. The feeding system comprises a receiving container for storing liquid medical waste and a feeding container for accommodating a coagulant. The feeding container comprises an outlet and a seal for closing the outlet, and the receiving container comprises a feeding connector with a feeding channel. The feeding container and the receiving container are provided with a guide mechanism comprising guide lugs and guide slots, and the feeding connector is provided with a plurality of splitting portions arranged along the circumferential direction of the feeding channel and spaced apart from each other by a certain distance. The guide mechanism allows the operation of rotating the feeding container by a predetermined angle relative to the receiving container, and this operation causes the splitting portions to cut the seal along the circumference (Continued)

of the feeding channel to destruct the seal, thereby causing the coagulant accommodated in the feeding container flows into the receiving container through the outlet. The present disclosure provides a safe and convenient operation manner for adding a coagulant into a storage container of liquid medical waste.

13 Claims, 8 Drawing Sheets

(58) Field of Classification Search
CPC ........ A47J 1/201; A47J 1/2013; A47J 1/2051; A47J 1/2089; A61M 11/06; A61M 16/0816; A61M 16/0833; A61M 16/16; A61M 16/162; A61M 2039/1027; A61M 2039/1033; A61M 2039/1066; A61M 39/1011; A61M 39/14; B01F 33/5011; B01F 35/3202; B01F 35/32021; B01F 35/713; B01F 35/7137; B01F 35/7163; B60R 16/00; B60R 3/04; B60R 39/02; B60R 39/04; B60R 39/12; B60R 69/0041; B65D 2251/0015; B65D 2251/0056; B65D 2251/0093; B65D 2401/15; B65D 51/20; B65D 51/222; B65D 51/2835; B65D 75/5877; B65D 77/08; B65D 81/3211; B65D 83/0055; B67B 7/24; B67B 7/26; B67C 9/00; B67D 3/00; B67D 3/0029; B67D 3/0032; F01M 11/00; F01M 11/0408; F01M 2011/0483; F01M 3/00; F16L 29/005; F16L 37/0841; F16L 37/42; F16L 55/115; F16N 35/00; F16N 37/00; F16N 37/02; G01N 35/1079; G03G 15/0884; Y10S 215/08; Y10S 604/905; Y10T 137/1759; Y10T 137/87965; Y10T 137/8811
USPC ........ 141/329, 330, 331, 375, 383; 206/222; 215/250; 222/541.2
See application file for complete search history.

(56) References Cited

U.S. PATENT DOCUMENTS

| | | | |
|---|---|---|---|
| 4,614,437 | A | 9/1986 | Buehler |
| 4,717,510 | A * | 1/1988 | James ..................... B65B 39/04 588/257 |
| 5,072,762 | A | 12/1991 | Jimenez |
| 5,280,764 | A | 1/1994 | Levinrad |
| 5,740,654 | A | 4/1998 | Manni et al. |
| 5,884,678 | A | 3/1999 | Chudy |
| 6,871,679 | B2 * | 3/2005 | Last ................... B65D 75/5877 141/10 |
| 10,494,164 | B2 | 12/2019 | Nickerson et al. |
| 10,562,691 | B2 * | 2/2020 | Krammer ................. B65B 3/04 |
| 10,675,219 | B2 | 6/2020 | Spallek et al. |
| 2008/0290061 | A1 | 11/2008 | Seelhofer |
| 2014/0034523 | A1 | 2/2014 | Valentine |
| 2014/0097106 | A1 | 4/2014 | Broekaert et al. |
| 2015/0251837 | A1 | 9/2015 | Krammer |
| 2021/0163209 | A1 * | 6/2021 | Jaramillo ........... B65D 81/3211 |

FOREIGN PATENT DOCUMENTS

| | | |
|---|---|---|
| CN | 106144198 A | 11/2016 |
| JP | H0678282 U | 11/1994 |
| JP | H11227774 A | 8/1999 |
| JP | H11349015 A | 12/1999 |
| JP | 2007290758 A | 11/2007 |
| JP | 2017159958 A | 9/2017 |
| WO | 0130665 A1 | 5/2001 |

OTHER PUBLICATIONS

Extended Search Report from counterpart European Application No. 17917216.8, dated Jun. 2, 2020, 9 pp.
Reconsideration Report by Examiner before Appeal and translation thereof, received in counterpart Japanese Application No. 2019-515341, dated Jan. 27, 2021, 8 pp.

* cited by examiner

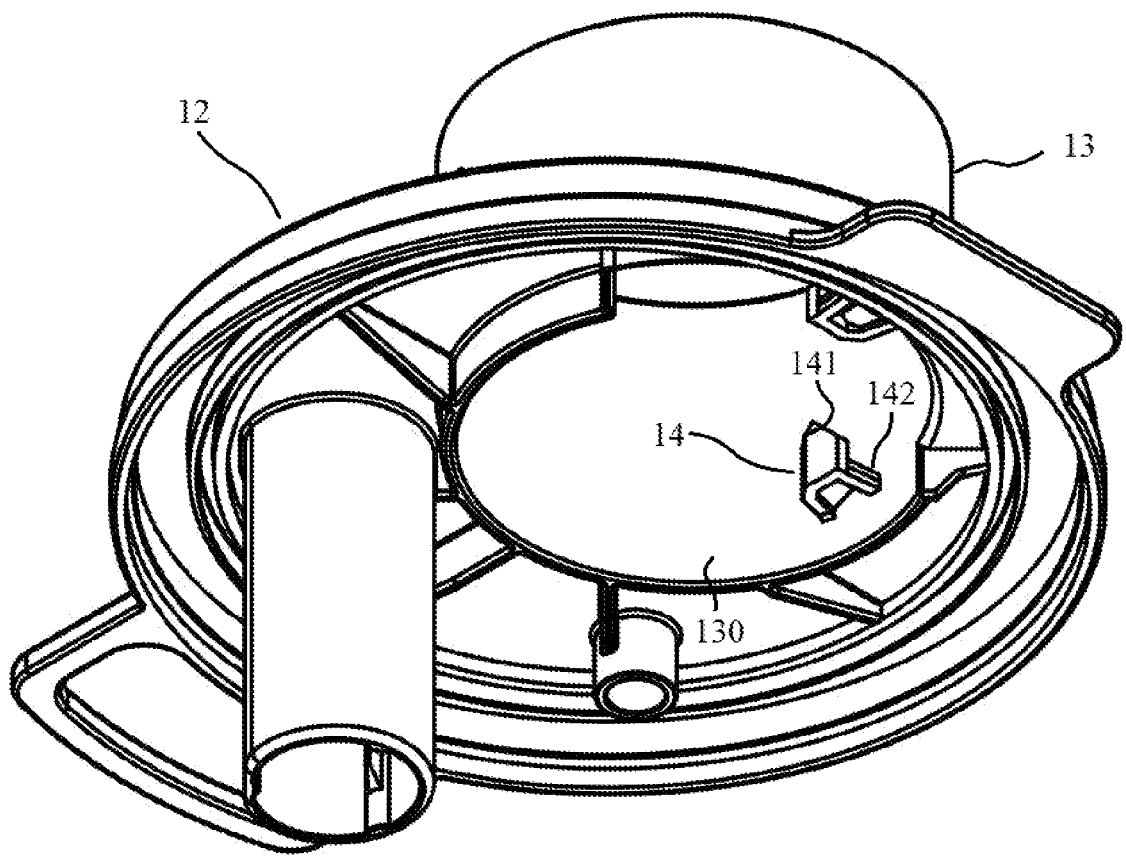
Fig. 12C
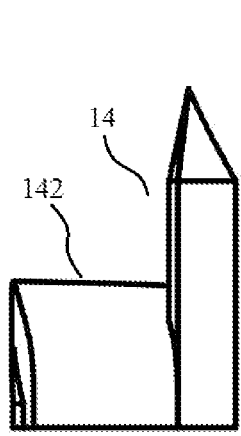 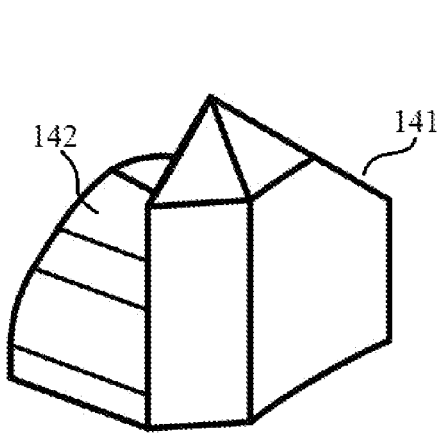 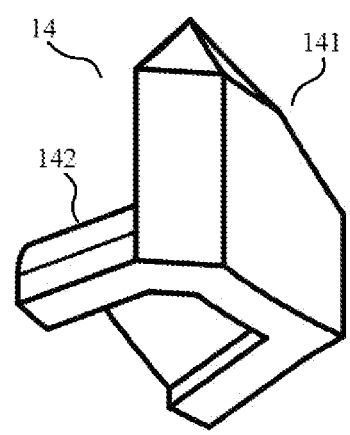
Fig. 13A　　　　　　　　Fig. 13B　　　　　　　　Fig. 13C

FEEDING SYSTEM FOR TREATING LIQUID MEDICAL WASTE This application is a continuation in-part of U.S. patent application Ser. No. 16/339,230 filed on Apr. 3, 2019, which is a U.S. national phase application of international application number PCT/CN2017/113469 filed on Nov. 29, 2017, which claims the benefit of priority to CN application number 201721210075.8 filed on Sep. 15, 2017. The entire contents of each are incorporated herein by reference.

TECHNICAL FIELD

The present disclosure relates to treatment technology related to liquid medical waste, and in particular relates to a feeding system for treating liquid medical waste.

BACKGROUND

At present, various liquid medical waste generated during clinical treatment in hospitals is usually sucked into a liquid waste collection tank by a negative pressure suction device. The liquid waste collection tank comprises a liquid waste collection bag, a tank body and a top cover. The liquid waste collection bag is disposed in the tank body. The top cover covers at a mouth of the tank body and is sealingly connected with a top portion of the liquid waste collection bag. On the top cover is usually provided a liquid waste outlet and a suction port communicated with the liquid waste collection bag.

When the liquid waste collection bag is filled with liquid waste, the liquid waste needs to be disposed. As the liquid medical waste contains a lot of bacteria, it is difficult to purify the liquid waste in an ordinary disposing manner of drain water. To prevent the liquid medical waste from being improperly drained into a sewage system and causing pollution to the environment, it is a commonly-used disposing manner to feed a coagulant into the liquid waste collection bag after the liquid waste collection bag is full of liquid waste, and then to dispose the coagulated liquid waste. At present, upon feeding the coagulant into the liquid waste collection bag, the doctors must open the top cover. Since liquid medical waste contains a lot of bacteria, the manner of feeding by opening the top cover not only causes inconvenience to the doctor's operations but also might cause secondary infection due to improper operations.

Although there are also some solutions proposed for the treatment of liquid medical waste in the prior art, which generally use feeding container which accommodates a coagulant and has an openable feeding outlet, such feeding container can provide a relatively safer way of operation. However, these solutions generally have the following two deficiencies: (1) the structure or material intended to seal the feeding outlet might still block the outflow of coagulant to some extent when the feeding outlet is opened; (2) the structure or material intended to seal the feeding outlet may fall into the liquid medical waste when the feeding outlet is opened, causing inconvenience in the subsequent treatment of the medical waste.

Therefore, there is a demand to provide a new feeding system for treating liquid medical waste, which at least partially alleviate or overcome the above-mentioned deficiencies existed in the prior art.

SUMMARY

In order to at least partially alleviate or overcome the above-mentioned deficiencies existed in the prior art, the present disclosure proposes a feeding system for treating liquid medical waste.

The present disclosure proposes a feeding system for treating liquid medical waste, the feeding system comprising a receiving container for storing liquid medical waste and a feeding container for accommodating a coagulant.

The feeding container comprises a feeding container body, guide slots provided at the circumferential outer side of the lower portion of the feeding container body, an outlet provided at the lower end of the feeding container body, and a seal which seals the outlet. The receiving container comprises a receiving container body, a top cover provided at the upper end of the receiving container body and covers said upper end, and a feeding connector connected with the top cover, and the feeding connector is provided with a feeding channel communicating with the receiving container body, wherein guide lugs are provided at the side wall of the feeding channel, and the guide lugs are configured for mating with the guide slots and extending into the guide slots, such that the feeding container is rotatably mounted to the feeding channel.

Moreover, the feeding connector is provided with a plurality of splitting portions for cutting through the seal, which are arranged along the circumference of the feeding channel and are spaced apart from each other by a certain distance. The guide slots comprise a first translational slot, a skewed slot and a second translational slot, wherein the first translational slot and the second translational slot are parallel to each other, and the first end of the skewed slot is connected with the first translational slot, the second end of the skewed slot is connected with the second translational slot.

When the guide lugs are moving along the first translational slot, the splitting portions are spaced apart from the seal. When the guide lugs are moving along the skewed slot from the first end to the second end of the skewed slot, the feeding container is guided to move downward such that the splitting portions come into contact with the seal and then pierce the seal. When the guide lugs are moving along the second translational slot, the splitting portions cut the seal along the circumferential direction of the feeding channel to destruct the seal, such that the coagulant accommodated in the feeding container is enabled to flow into the receiving container body through the outlet.

According to an aspect of the present disclosure, the number of the splitting portions is at least three, and wherein a pair of adjacent splitting portions are spaced from each other by a first circumferential angle, and the other pairs of adjacent splitting portions are spaced from each other by a second circumferential angle, and the circumferential angle corresponding to the second translational slot equals to a third circumferential angle. And the first circumferential angle is greater than the third circumferential angle and the third circumferential angle is greater than the second circumferential angle, such that when the guide lugs have moved through the entire second translational slot, a majority of the periphery of the seal has been cut by the splitting portions along the circumferential direction of the feeding channel.

According to this aspect of the present disclosure, through this structure, a small portion of the periphery of the seal remains connected to the feeding container to prevent the seal from falling off, meanwhile, a greater area of the outlet is opened for the coagulant to flow out.

According to an aspect of the present disclosure, the number of the splitting portions is three, the first circumferential angle is about 180°, the second circumferential angle is about 90°.

According to an aspect of the present disclosure, when the feeding container is mounted to the feeding channel, there is a radial gap between the circumferential edge of the outlet and the splitting portions, wherein the radial gap is no less than 0.5 mm and no more than 2.0 mm.

According to this aspect of the present disclosure, through this design, the seal that has not been completely cut will not fall off, and the seal will be rolled into this radial gap instead, thereby causing the seal as a whole to be basically restricted within the range of the radial gap, to reduce or even prevent the obstruction to the flow of the coagulant caused by the seal.

According to an aspect of the present disclosure, the radial gap is no less than 0.7 mm and no more than 1.0 mm.

According to an aspect of the present disclosure, the seal is a composite film made of PET (i.e. polyethylene terephthalate) and PE (i.e. polyethylene), or a composite film made of PET and PP (i.e. polypropylene). And the thickness of the composite film is no less than 0.05 mm.

According to an aspect of the present disclosure, each splitting portion comprises a blade portion and a radial connecting portion, and the blade portion is connected to the side wall of the feeding channel via the radial connecting portion and is positioned below the guide lugs, wherein the blade portion has a tip extending upward substantially along the extending direction of the feeding channel and a flat surface facing towards the side wall of the feeding channel, the radial distances between the flat surface of the blade portion of each splitting portion and the side wall of the feeding channel are substantially the same.

It will be appreciated that the size of the radial distance is substantially equal to the size of the aforementioned radial gap.

According to an aspect of the present disclosure, when the feeding container is guided to rotate in a first direction relative to the receiving container, the feeding container moves downward such that the splitting portions come into contact with the seal and pierce the seal, and the blade portion has a forward cutting edge and a non-sharp back surface, the forward cutting edge is positioned at an upstream position of the non-sharp back surface along the first direction. And, the blade portion has a height along the extending direction of the feeding channel and a width substantially along the circumferential direction of the feeding channel, wherein the height of the blade portion is no less than 4 mm and no more than 16 mm, and the width of the blade portion is no less than 2 mm and no more than 8 mm.

According to an aspect of the present disclosure, the feeding container body has an inner diameter that is substantially uniform along its height direction.

According to this aspect of the present disclosure, a feeding container without a neck portion can be provided, so that the feeding speed of the coagulant can be further increased, and the feeding outlet would be less likely to get blocked.

According to an aspect of the present disclosure, the inner diameter of the feeding container body is no less than 20 mm and no more than 80 mm, and preferably, no less than 40 mm and no more than 60 mm.

According to an aspect of the present disclosure, the splitting portions are integrally formed with the feeding connector and the top cover, and are made of plastic material, and the top cover is fixedly connected with the receiving container body.

According to this aspect of the present disclosure, through this structure comprising a splitting portion made of plastic that is less sharp than that made of other materials, the event of the seal being completely cut and falling off, which is undesirable, can be avoided.

According to an aspect of the present disclosure, a lower part of the feeding container body constitutes a neck portion of the feeding container body.

According to an aspect of the present disclosure, the number of the guide lugs and the number of the guide slots are two respectively.

According to an aspect of the present disclosure, the length of the second translational slot exceeds the length of the skewed slot.

According to an aspect of the present disclosure, the splitting portions are positioned adjacent to the side wall of the feeding channel.

The above-described various designs and preferred conditions can be arbitrarily combined to obtain various embodiments of the present disclosure.

The progressive effects and advantages of the present disclosure are as follows.

The feeding system for treating liquid medical waste according to various aspects of the present disclosure provides a safe operation manner for adding coagulant into the storage container of liquid medical waste, and the required operation of the feeding system is very convenient.

BRIEF DESCRIPTION OF THE DRAWINGS

The present disclosure will be further described with reference to figures.

FIGS. 11A-11D show schematic diagrams of the feeding system according to the second embodiment of the present disclosure in different operating states, in which FIGS. 11A-11D show in sequence the first state where the splitting portions have not pierced the seal, the second state where the splitting portions have just pierced the seal, the third state where the splitting portions are in the cutting process of cutting the seal along the periphery, and the fourth state corresponding to the end of the cutting operation.

FIGS. 12A-12C show respectively a top view, a bottom view, and a view from an oblique upward perspective of the top cover and the feeding connector part of the receiving container in the feeding system according to the second embodiment of the present disclosure.

FIGS. 13A-13C show enlarged views of the splitting portions in the receiving container in the feeding system according to the second embodiment of the present disclosure, in three different views respectively.

DETAILED DESCRIPTION

Figure 1:
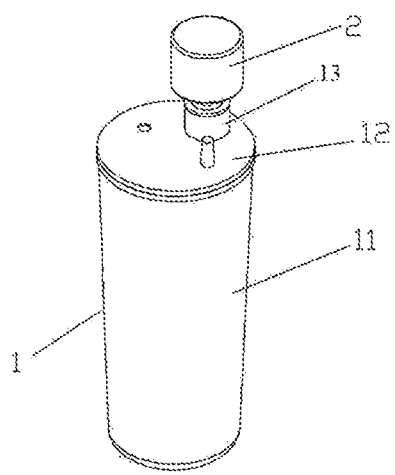
FIG. 1 shows a schematic diagram of an appearance of a feeding system according to a first embodiment of the present disclosure.
Figure 2:
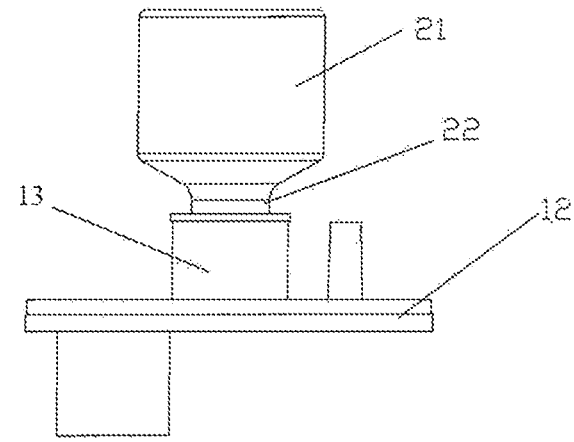
FIG. 2 shows a partially-enlarged schematic diagram of a feeding system according to a first embodiment of the present disclosure.

The preferred embodiments of the present disclosure will be further described in detail hereinafter, with reference to the accompanying figures of the specification. The following description is exemplary and not intended to limit the scope of the present disclosure. Any other similar embodiment also falls within the protection scope of the present disclosure.

In the following detailed description, directional terms, such as "left", "right", "upper", "lower", "front", "rear", etc., are used with reference to the directions illustrated in the drawings. The components described in the embodiments of the present disclosure may be placed in a variety of different directions, and the directional terms are used for the purpose of exemplified illustration rather than for limiting the present disclosure.

Referring to FIGS. 1-10, those figures illustrate a feeding system according to a first embodiment of the present disclosure, which comprises a receiving container 1 and a feeding container 2. In the examples described hereinafter, the receiving container 1 may be a collection bag or container for liquid medical waste, and the feeding container 2 may be a feeding bottle accommodating a coagulant therein.

The receiving container 1 comprises a receiving container body 11, a top cover 12 covering an upper end of the receiving container body, and a feeding connector 13. The feeding connector 13 may be substantially tubular, the feeding connector 13 is connected with the top cover 12, and the feeding connector 13 is provided with a feeding channel 130 communicated with the receiving container body 11.

The feeding container 2 comprises a feeding container body 21 and a neck portion 22. A lower end of the neck portion 22 has an outlet 23. It will be appreciated that, in the examples illustrated in FIGS. 1-10, the neck portion 22 constitutes the lower part of the feeding container 2 as described herein, but it is also feasible that the lower part of the feeding container 2 is not configured to be such a neck portion structure. And, as described below, in some embodiments of the present disclosure, it may be more advantageous for the system that the lower portion of the feeding container 2 adopts a structure other than such a neck portion, since the structure of the neck portion 22 in this example will limit the passing area of the opened outlet, to some extent.

The feeding container 2 is provided with a seal 24 which seals the outlet 23. The seal 24 may employ a film-like seal which for example may be made of an aluminum foil film. The neck portion 22 is rotatably mounted in the feeding channel 130 of the feeding connector 13. A side of the neck portion 22 is provided with guide slots 221. A sidewall of the feeding channel 130 is provided with a guide lugs 131 mating with the guide slots 221. The guide lugs 131 extend into the guide slots 221. The guide slots 221 is shaped in a way of guiding the feeding container 2 to move downward from an initial position when the feeding container 2 rotates in a predetermined direction due to the action of an external force. The number of guide lugs 131 may be one or more. When the number of the guide lugs 131 is plural, the plurality of guide lugs 131 mate with the plurality of guide slots 221 in one to one correspondence. A sealing ring 25 is sleeved or arranged at the outside of the neck portion 22, and the sealing ring 25 is in sealing contact with the side wall of the feeding channel 130.

In the present embodiment, the guide slot 221 comprises a first displacement slot 2211, a skewed slot 2213 and a second displacement slot 2212. The first displacement slot 2211 is parallel to the second displacement shot 2212, an end of the skewed slot 2213 is connected with the first displacement slot 2211, and the other end of the skewed slot 2213 is connected with the second displacement slot 2212.

Optionally, a plurality of first displacement slots 2211 mating with the plurality of guide lugs 131 respectively are all located at a first circumference, and a plurality of second guide slots 2212 corresponding to the plurality of guide lugs 131 are all located at a second circumference. In the present embodiment, the number of the guide lugs 131 is two.

The feeding connector 13 is provided with a seal destruction portion. The seal destruction portion is used to destruct the seal 24 while the feeding container 2 is moving downward, such that the material in the feeding container 2 flows into the receiving container body 11 through the outlet 23 of the neck portion 22.

Figure 10:
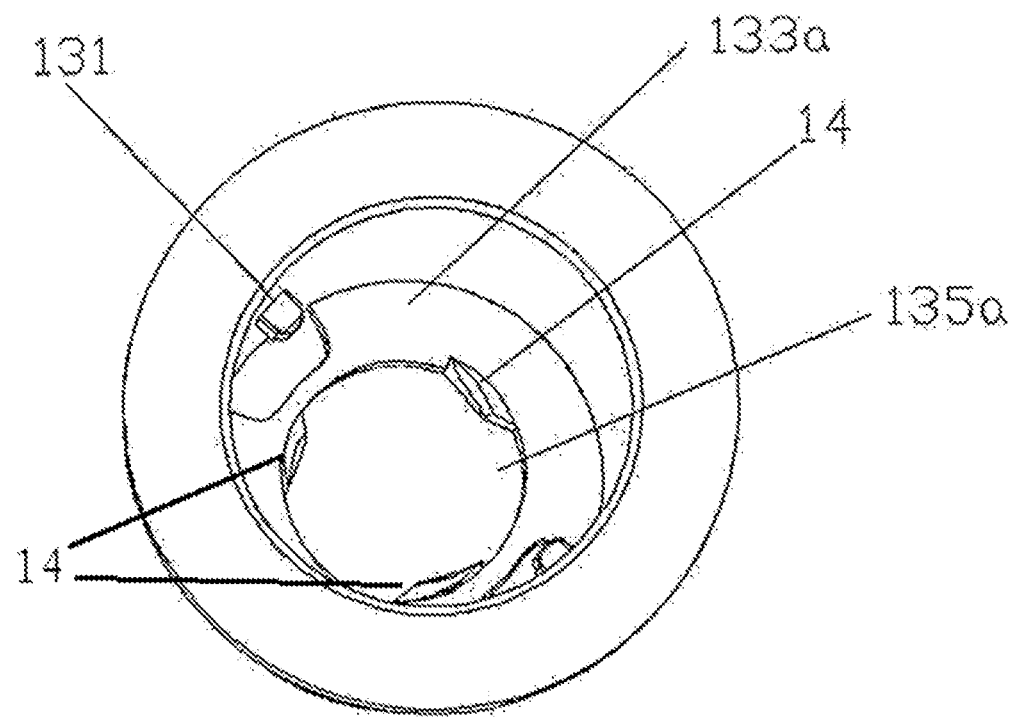
FIG. 10 shows a perspective view of a feeding connector according to a first embodiment of the present disclosure, wherein an exemplified structure of a seal destruction portion comprising a plurality of splitting portions is illustrated.

In the example shown in FIG. 3 through FIG. 10, the seal destruction portion is comprised of a plurality of splitting portions 14 which split the seal 24. In the example as illustrated in FIG. 10, the feeding connector 13 is provided with a base plate 133a, a circumference of which is connected with the sidewall of the feeding channel 130. The base plate 133a is provided with a central through hole 135a, and a bottom end of the splitting portions 14 are connected with a wall of the central through hole 135a.

Figure 3:
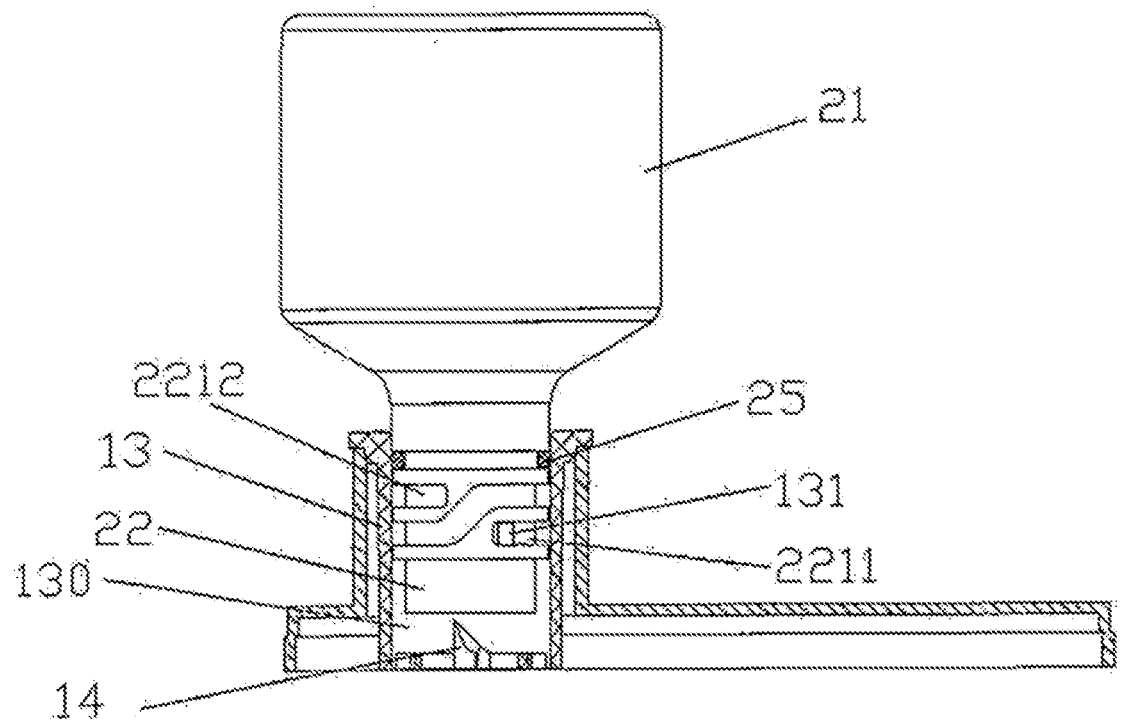
FIG. 3 through FIG. 6 show a schematic diagram (local cross-sectional view) of a process in which a feeding container moves downward from an initial position according to a first embodiment of the present disclosure.
Figure 4:
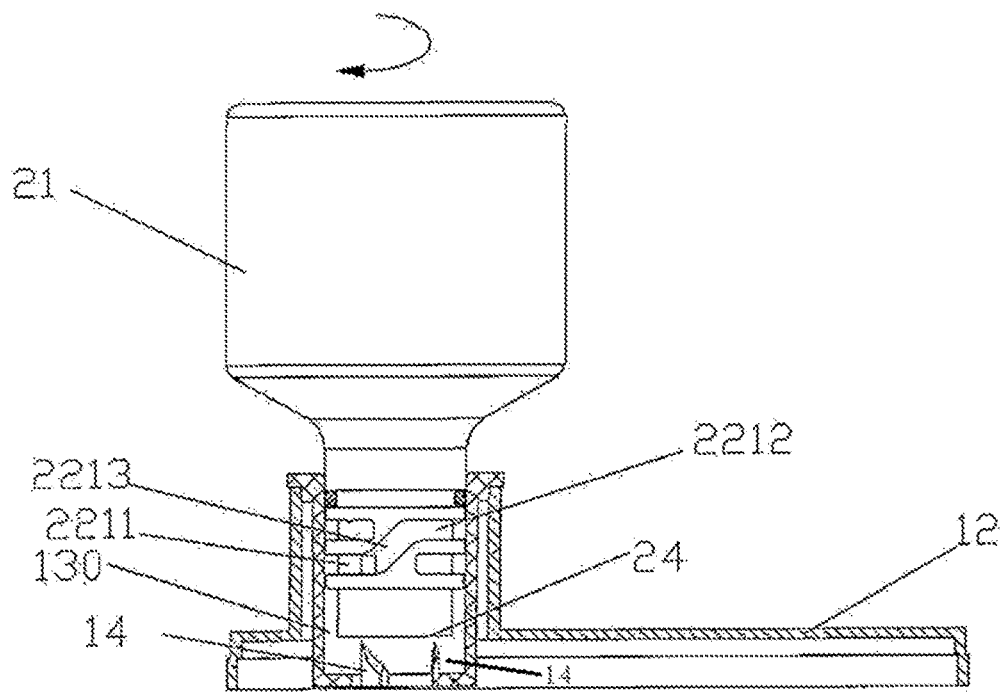
Figure 5:
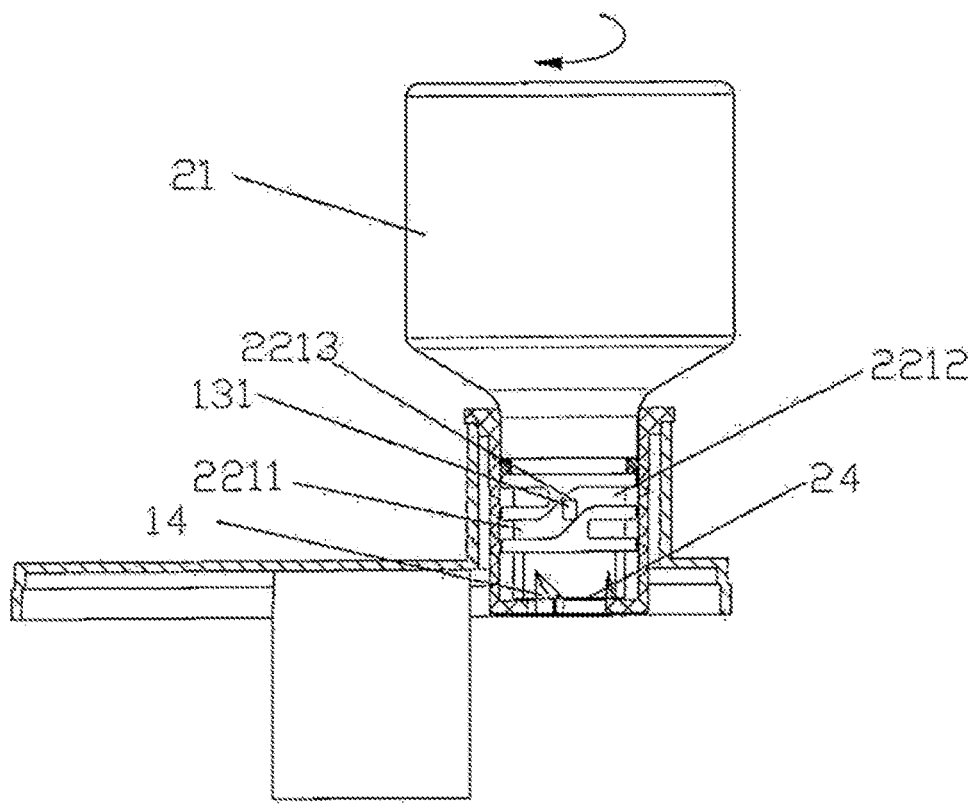

FIG. 3 through FIG. 6 show a working process in which the seal destruction portion destructs the seal 24. In FIG. 3, the feeding container 2 is at an initial position. At this time, the two guide lugs 131 are respectively located in the first displacement slot 2211 corresponding thereto, and the splitting portion 14 does not contact the seal 24. Since the two guide lugs 131 are spaced apart by 180°, the figures can only display one of the guide lugs 131. As shown in FIG. 4, when the feeding container 2 rotates in a predetermined direction (clockwise direction in FIG. 4) due to the action of an external force, the two guide lugs 131 respectively move along the first displacement shots 2211 to an end of the corresponding skewed slots 2213 at first, whereupon the splitting portion 14 still does not contact the seal 24. As shown in FIG. 5, the feeding container 2 continues to rotate in the clockwise direction, and the two guide lugs 131 move upward along the corresponding skewed slots 2213, i.e., the feeding container 2 moves downward. In this process, the splitting portions 14 contact and split the seal 24, such that the material in the feeding container 2 flows through the outlet 23 of the neck portion 22 into the receiving container body 11.

Figure 6:
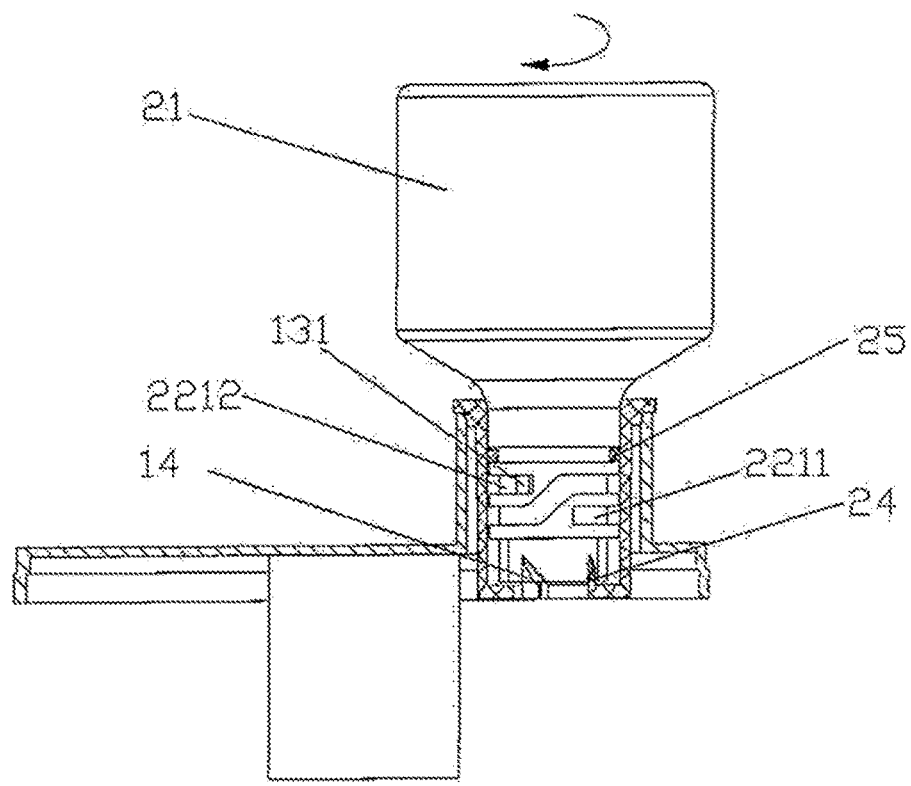
Figure 7:
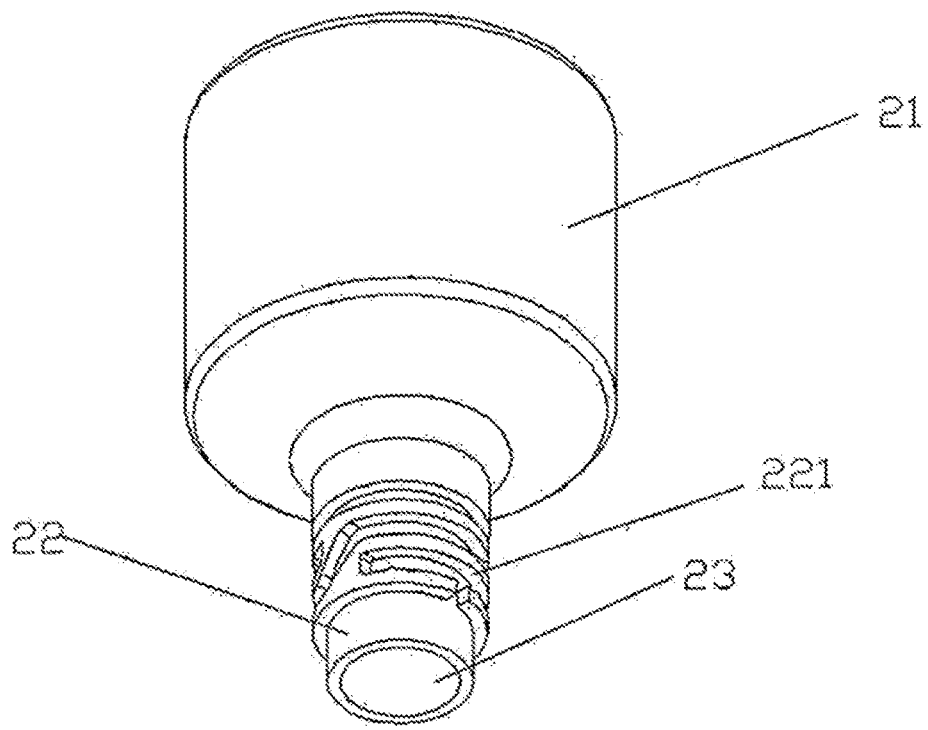
FIG. 7 shows a perspective view of a feeding container according to a first embodiment of the present disclosure.
Figure 8:
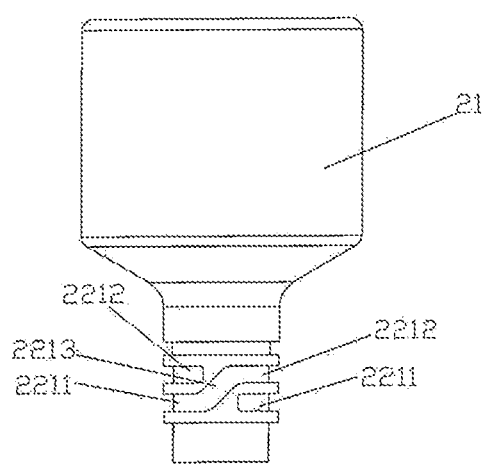
FIG. 8 and FIG. 9 show an appearance of a feeding container according to a first embodiment of the present disclosure from different perspectives respectively, wherein the guide structure comprising guide slots and lugs is illustrated in those figures.
Figure 9:
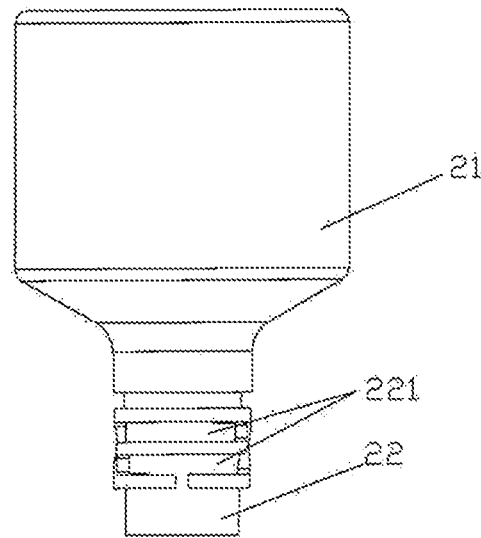

As shown in FIG. 6, as the feeding container 2 continues to rotate, the two guide lugs 131 move from the other end of the corresponding skewed slots 2213 into the second displacement slot 2212, whereupon the feeding container 2 will not move downward any longer.

With reference to FIGS. 3-6 and particularly with reference to FIG. 10, it can be understood that in the first embodiment as described above, since the splitting portions 14 are arranged along the circumferential direction of the feeding channel 130 and spaced apart from each other by a certain distance, the seal of the feeding container can be cut along the circumferential edge of the seal. Moreover, a majority or most of the circumferential edge of the seal can be cut selectively, such that the passage for the coagulant to flow out of the feeding container is opened on one hand, and on the other hand, the seal may not be completely cut and thus falls into the receiving container or falls into the liquid medical waste stored in the receiving container.

And preferably, in the first embodiment described above, the splitting portions 14 may be arranged in such a manner that a pair of adjacent splitting portions are spaced from each other by a first circumferential angle, and the other pairs of adjacent splitting portions are spaced from each other by a second circumferential angle, and the circumferential angle corresponding to the second translational slot is a third circumferential angle. In the embodiment, the first circumferential angle is greater than the third circumferential angle and the third circumferential angle is greater than the second circumferential angle, such that when the guide lugs have moved through the entire second translational slot, a majority of the periphery of the seal has been cut by the splitting portions along the circumferential direction of the feeding channel. According to such a solution, when the operator operates the feeding container to rotate in a predetermined direction relative to the receiving container for feeding, the operator can safely perform and complete the entire rotation process (said rotation process is restricted by the guide slots 221) in a single action, without worrying about the risk of the seal falling.

Figure 11A:
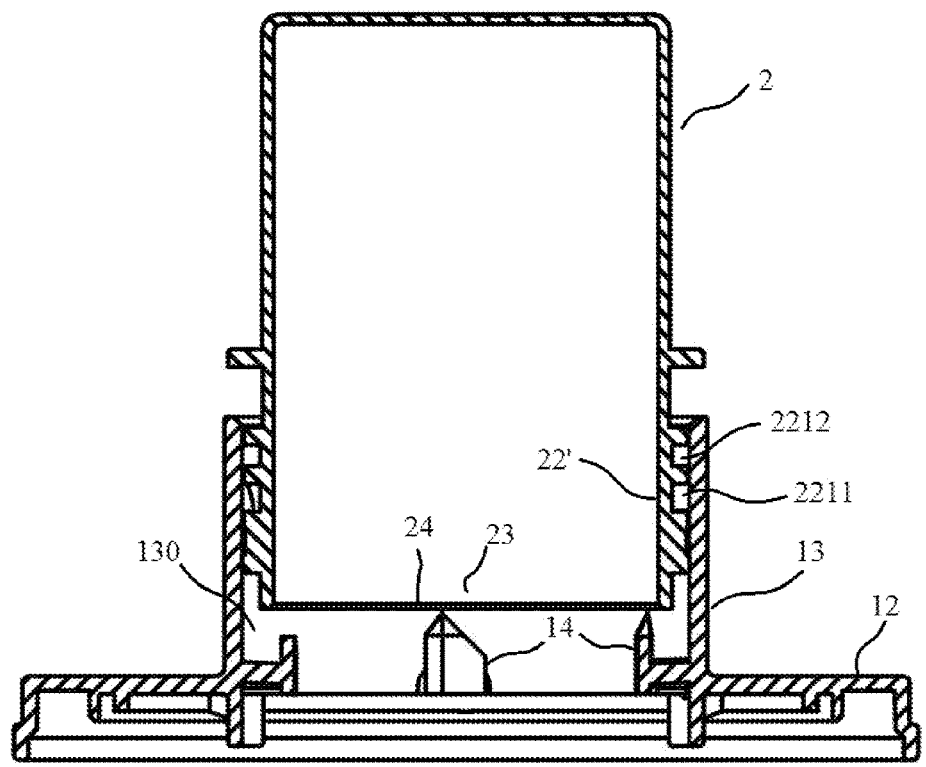
Figure 11B:
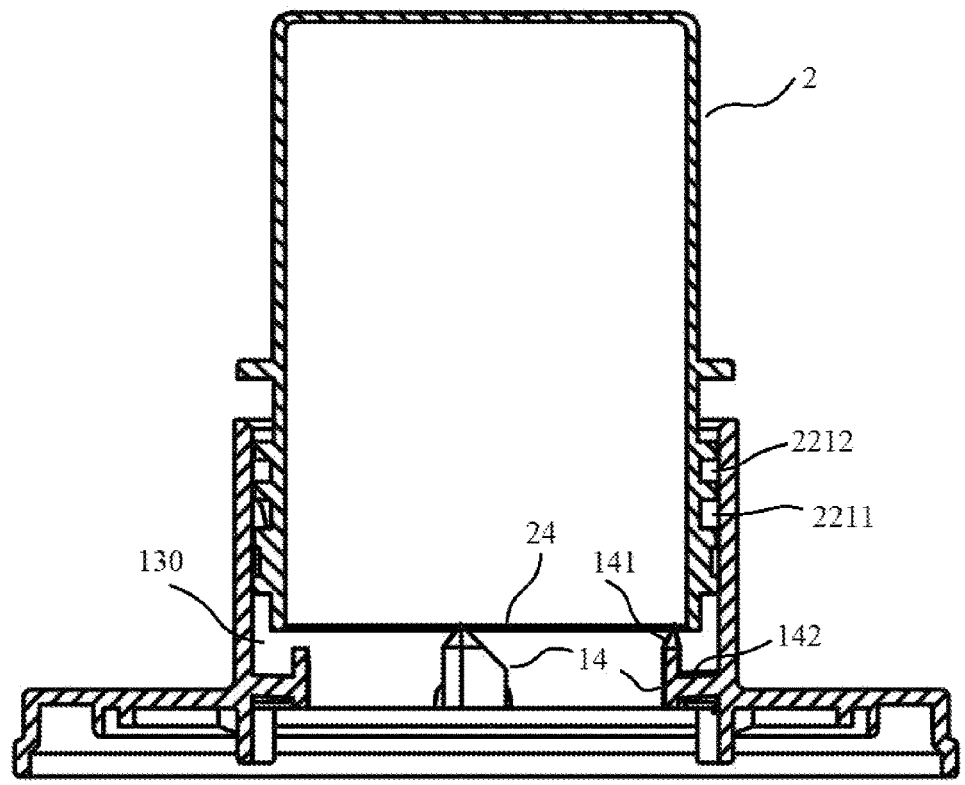
Figure 11C:
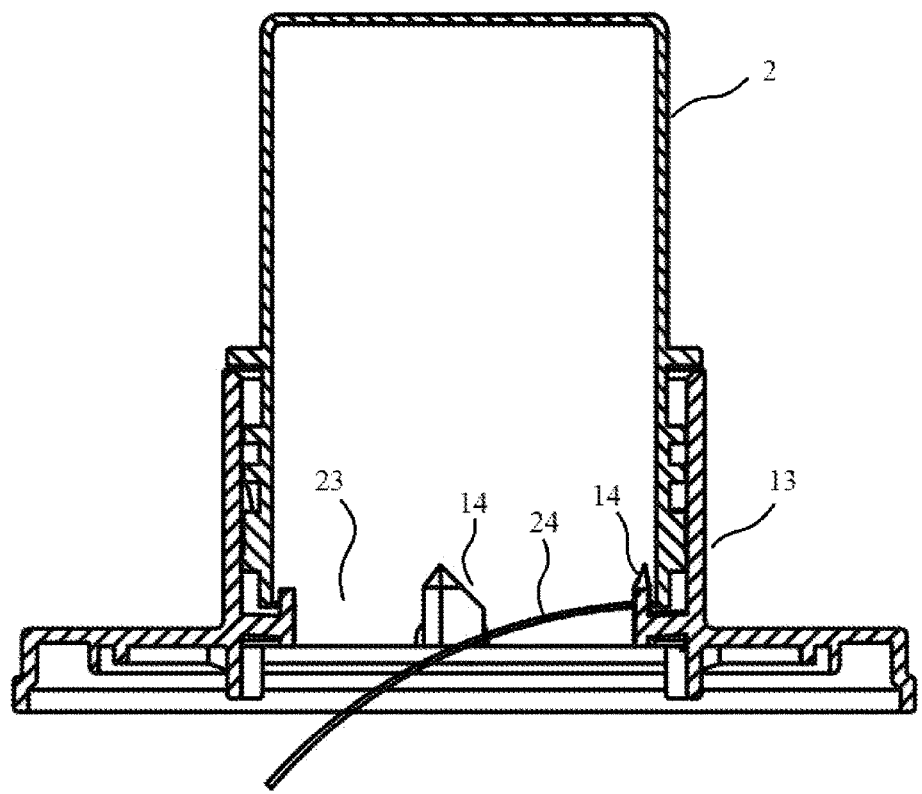
Figure 11D:
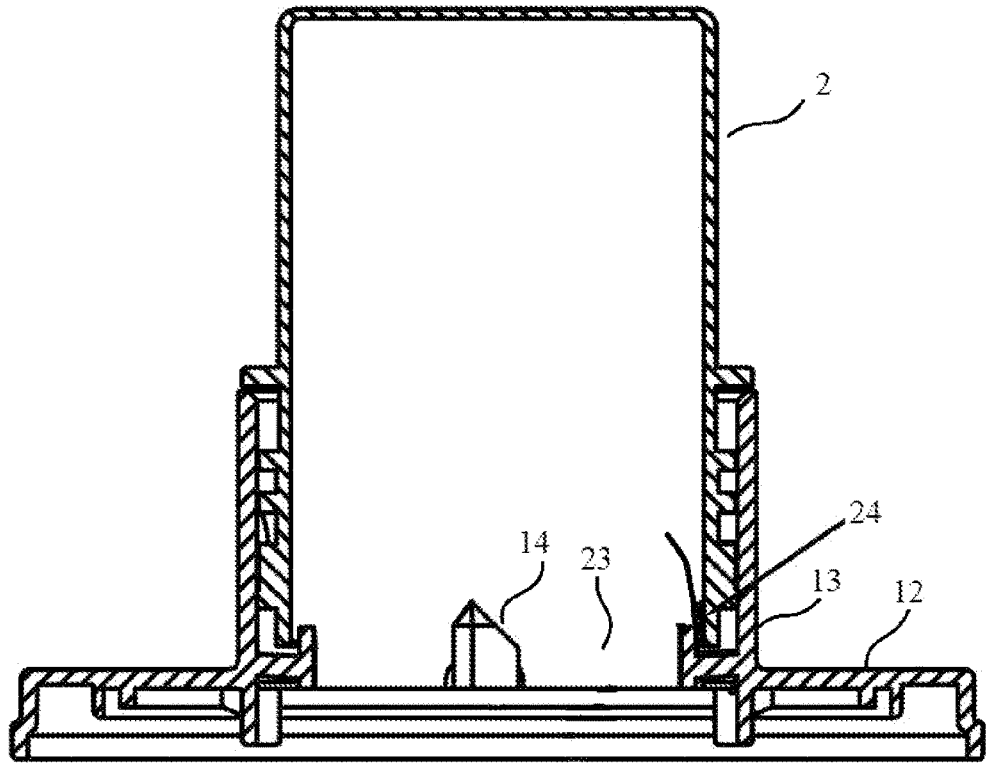
Figure 12A:
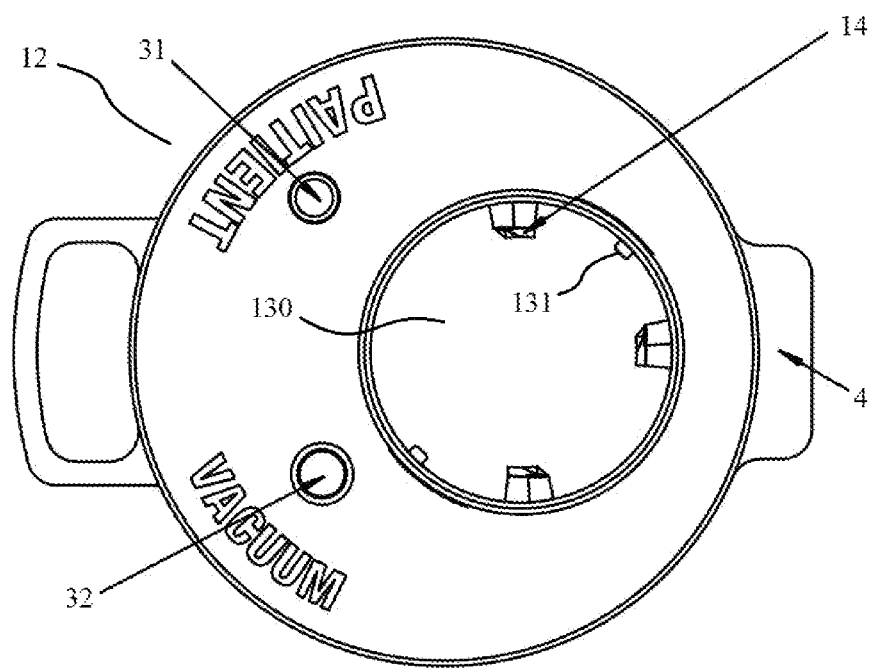
Figure 12B:
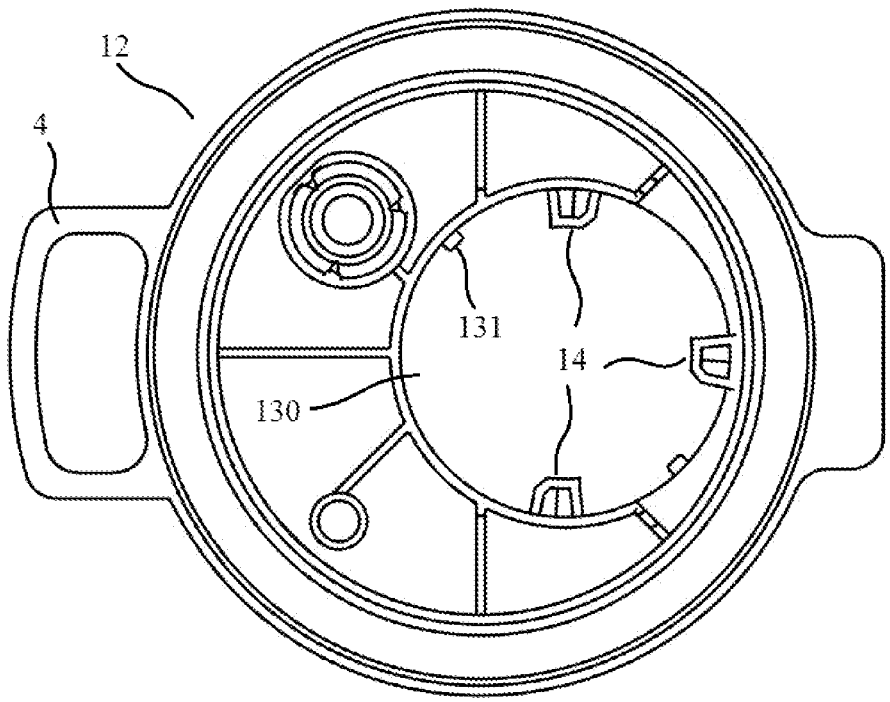

In the context of the present disclosure, the feeding container 2, the receiving container 1, and the feeding channel 130 can generally be understood as having a longitudinal axis along its height direction, and the circumferential direction of the feeding container 2, the receiving container 1 or the feeding channel 130 generally refers to the direction surrounding the longitudinal axis. The circumferential edge of the outlet 23 is arranged substantially along the aforementioned circumferential direction. For example, in the accompanying FIGS. 2-6, 8-9, 11A-11D, the height direction of the feeding container 2, the receiving container 1, the feeding channel 130 and the longitudinal axis along the height direction extend in an up and down direction. In FIGS. 12A-12B, said longitudinal axis extends along the direction perpendicular to the plane of paper.

The feeding system according to the second embodiment of the present disclosure will be described in detail hereinafter, with reference mainly to FIGS. 11A-11D, FIGS. 12A-12C, FIGS. 13A-13C, and in conjunction with FIGS. 3-9, especially in conjunction with the guide structure including the guide lugs 131 and the guide slots 221 as shown in FIGS. 3-9.

It would be understood that the feeding system according to the second embodiment and the first embodiment described above have basically the same overall structure and the same guiding structure. One main difference lies between the two embodiments is that, the feeding container 2 in the second embodiment has an inner diameter that is substantially constant along its height direction, that is, the feeding container 2 in the second embodiment does not have a tapered neck portion. As shown in FIGS. 11A-11D, the size of the inner diameter of the lower part 22' of the feeding container body is uniform with the size of the inner diameter at other positions of the feeding container 2. The lower portion 22' of the feeding container body as shown in FIGS. 11A-11D is substantially the same as the neck portion 22 described above, with regard to the other respects.

An advantage of this design is that it can increase the feeding speed of the coagulant. In addition, since the size of the outlet is consistent with the inner diameter of the feeding container, the deficiency in those designs with the inner diameter of the outlet being smaller than the inner diameter of the feeding container may be overcome, that is, the coagulant or the material formed by the coagulant by rapidly absorbing water, may be accumulated in the vicinity of the tapered neck portion, which may further cause the outlet of the feeding container to be blocked.

Compared with the first embodiment described above, another main difference of the second embodiment is that a different structure design for the multiple splitting portions provided in the feeding connector is adopted. It would be understood that in the description of the second embodiment, those parts of the structure being substantially identical to that of the aforementioned first embodiment will not be described in detail below. And the specific differences in the structure of the second embodiment are described in detail hereinafter.

FIGS. 11A-11D, FIGS. 12A-12C and FIGS. 13A-13C show the second embodiment in combination. As illustrated in these figures, in the feeding system according to the second embodiment of the present disclosure, three splitting portions 14 may be provided inside the feeding channel 130 of the feeding connector 13 of the feeding container 1. Among the three splitting portions 14, a pair of adjacent splitting portions 14 are spaced from each other by a first circumferential angle, and the other pairs of adjacent splitting portions 14 are spaced from each other by a second circumferential angle, and the circumferential angle corresponding to the second translational slot 2212 is a third circumferential angle. In the embodiment, the first circumferential angle is greater than the third circumferential angle and the third circumferential angle is greater than the second circumferential angle, such that when the guide lugs 131 have moved through the entire second translational slot 2212, a majority of the periphery of the seal 24 has been cut by the splitting portions 14 along the circumferential direction of the feeding channel 130, whereas a small part or minor of the periphery of the seal 24 remains uncut and is still connected to the side wall of the feeding channel 130.

In other words, the angle corresponding to the rotation displacement through the second translational slot 2212 is greater than the second circumferential angle and smaller than the first circumferential angle, such that after such rotation process, it can be ensured that a small portion of the peripheral edge of the seal 24 is still connected to the feeding container 2 so as to prevent the seal 24 from falling, and at the same time, it enables the outlet to be opened to achieve a relatively large opened area, so as to promote the coagulant to pass through the outlet.

Particularly referring to FIGS. 12A and 12B, in the preferred embodiment, the first circumferential angle is about 180°, the second circumferential angle is about 90°, and the third circumferential angle is larger than the second circumferential angle. That is, the three splitting portions 14 spaced apart from each other are substantially arranged at equal intervals over a half circumference of the feeding channel 130 with an angular interval of 90°, and wherein the two splitting portions 14 positioned opposite to each other (that is, the two splitting portions 14 positioned opposite to each other along the up and down direction in the figure) are separated by an angular interval of about 180°.

It would be understood that the expression of a circumferential angle being approximately or about a specific angle appeared in the context can generally be understood as within a range of ±15° deviation from said specific angle, and preferably within a range of ±5° deviation from the specific angle. In some preferred embodiments, the third circumferential angle is approximately 50°-70° greater than the second circumferential angle. More preferably, the second circumferential angle is about 90°, and the third circumferential angle is about 150°, and the circumferential angle corresponding to the skewed slot 2213 is about 20°-30°.

Therefore, the length of the second translational slot 2212 enables the guide lugs 131 to slide along the second translational slot 2212 over its entire length, which ensures that about three-quarters (i.e. 270°) of the circumference of the seal 24 will be cut. Moreover, when said three-quarters of the periphery of the seal 24 have been cut, since the seal 24 is no longer stretched by a radial force, the remaining uncut periphery (i.e. about one-fourth of the periphery) of the seal 24 is less likely to be cut off. In addition, since the splitting portion 14 pierces the seal 24 during the process of the guide lugs 131 sliding along the skewed slot 2213, in this process the seal 24 may also be cut slightly in the peripheral direction. However, it will not adversely affect the above design as long as the skewed slot 2213 is not designed to be too long.

Moreover, another advantage of the embodiment as shown in these figures is that, according to this feeding system, the feeding operation of adding the coagulant accommodated in the feeding container 2 into the liquid medical waste contained in the receiving container 1 can be performed, by only rotating the feeding container 2 relative to the receiving container 1 by a rotation angle of about 90° or slightly more than 90° (for example, 105° to 150°). Such operation process is shown in FIGS. 11A-11D, in sequence. As for the typical situation in which the operator operates the feeding system or the feeding container 2 by hand, the rotation angle defined as above enables the operator to complete the feeding operation in a single action easily, without having to rotate the feeding container 2 continuously or step by step to reach a greater rotation angle. In addition, the operation process defined by the structural design described above can avoid the risk of misoperation during the feeding operation.

According to some examples, the angle corresponding to the skewed slot 2213 may be designed to be significantly smaller than the second circumferential angle, for example, said angle corresponding to the skewed slot 2213 may be in the range of 10°-45°, and preferably in the range of 20°-30°. It is also appreciated that, from another perspective, the length of the skewed slot 2213 being relatively short allows the movement of the splitting portion 14 during the operation process, in which the guide lugs 131 is sliding through the skewed slot 2213, to have a greater component in the height direction as shown. Accordingly, it will be easier for the tip of the splitting portion 14 to pierce the seal 24.

It would be understood that, in conjunction with FIGS. 12A-12C and FIGS. 11A-11D, although only two splitting portions 14 are explicitly shown in FIGS. 11A-D due to the view of the figures, the illustrated example actually includes three splitting portions 14. The splitting portion 14 as shown in the middle area in the figure actually represents two splitting portions 14 overlapping in this angle of view. These two splitting portions 14 are arranged opposite to each other along a direction perpendicular to the plane of paper.

The embodiment of the present disclosure is described above, as an exemplified design comprising the three splitting portions 14 with a first circumferential angle of about 180°, a second circumferential angle of about 90°, and a third circumferential angle of greater than second circumferential angle and the corresponding guide slots 221. However, it would be understood that, under the condition that the above defined relationship between these circumferential angles is satisfied, other numbers of splitting portions 14 and/or other specific values of those circumferential angles are also feasible.

According to the second embodiment, when the feeding container 2 is mounted to the feeding channel 130, there is a radial gap between the circumferential edge of the outlet 23 and the splitting portions 14, and the radial gap is no less than 0.5 mm and no more than 2.0 mm, and preferably, the radial gap is no less than 0.7 mm and no more than 1.0 mm.

There is a radial gap between the circumferential edge of the outlet 23 and the splitting portions 14, i.e. there is a radial gap between the inner wall of the feeding container 2 and the splitting portions 14. According to this solution, the seal 24 which is not completely cut will not fall, rather it will be rolled into said radial gap, such that the seal 24 as a whole is rolled into this radial gap and thus extends in a direction close to the vertical direction and in the vicinity of the side wall of the feeding channel 130. Consequently, the seal 24 is prevented from blocking the feeding of the coagulant to a great extent. For example, when the aforementioned feeding operation is performed in the feeding system, and the feeding container 2 is rotated relative to the receiving container 1 until the movement of the lugs 131 along the entire second translational slot 2212 is finished, as shown in FIG. 11D, the seal 24 partially connected to the feeding container 2 will be rolled upward by the splitting portion 14 with this rotation process and will be more or less folded in this radial gap.

This is especially suitable for film seal 24 made of materials with a certain strength or tenacity, because such films tend to maintain a certain extension along the radial direction of the feeding channel 130, and with the rotation process, the splitting portion 14 will force the film to be rolled into the gap between the splitting portion 14 and the inner wall of the feeding container 2. Moreover, the size of such a radial gap has been tested for many times, and it is found that the above described size of the radial gap is especially suitable for the seal 24 made of common film with a thickness of less than 0.2 mm or even less than 0.1 mm. It is found that the size of such a radial gap can not only provide a relatively large area of the channel to enhance outflow of the coagulant, but also provide sufficient space for accommodating the film rolled into the radial gap which may possibly be folded to some extent, whereas most of the folded film can be maintained in the radial gap.

Moreover, compared to those solutions in which the rotation process required for the feeding operation is not limited by a structural design, according to the embodiment combining the specific range of the first, second and third circumferential angles as described above with the above design related to the radial gap, it is possible to achieve the technical effect as follows. At the end of the rotation operation required for the feeding operation, a majority of the peripheral edge of the seal 24 is cut, whereas a small portion of the peripheral edge remains connected to the side wall of the feeding container 2. Meanwhile, said small portion of the uncut peripheral edge will be located approximately between a certain splitting portion 14 and the side wall of the feeding container 2. This will further help to prevent the cut seal 24 from blocking the output.

With further reference to FIGS. 12C and 13A-13C, in the second embodiment, preferably, each splitting portion 14 may include a blade portion 141 and a radial connection portion 142. It can be understood that the radial connection portion 142 extends a short distance from the side wall of the feeding channel 130 in a radially inward direction and is connected to the blade portion 141. The blade portion 141 is connected to the side wall of the feeding channel 130 via the radial connection portion 142 and is located below the guide lugs 131. The blade portion 141 has a tip that extends substantially upward along the extending direction of the feeding channel 130 and has a flat surface facing towards the side wall of the channel 130. The radial distance between the flat surface and the side wall of the feeding channel 130 is substantially constant. It can be understood that the size of the radial distance substantially equals to the size of the aforementioned radial gap.

In the second embodiment, the splitting portion 14 may adopt a more specific structural design as follows.

When the feeding container 2 is guided to rotate in a first direction relative to the receiving container 1, the feeding container 2 moves downward such that the splitting portions 14 come into contact with the seal and pierce the seal 24, and the blade portion 141 has a forward cutting edge and a non-sharp back surface, the forward cutting edge is positioned at an upstream position of the non-sharp back surface along the first direction. And the blade portion 141 has a height along the extending direction of the feeding channel 130 and a width substantially along the circumferential direction of the feeding channel 130. The height of the blade portion may be no less than 4 mm and no more than 16 mm, and the width of the blade portion 141 may be no less than 2 mm and no more than 8 mm.

Among them, the forward cutting edge and the non-sharp back surface can be understood as the cutting edge facing the rotation direction and the back surface backing towards the rotation direction during the rotation operation of the splitting portions, respectively. The blade portion 141 has a height and a width as defined above, such that it can have a proper surface area so as to roll the partially cut sealing film into the gap and maintain or limit the film within the gap.

More specifically, as shown in FIGS. 13A-13C, the tip of the blade portion 141 may specifically be formed with the shape of a triangular pyramid, wherein two arris of the triangular pyramid are respectively oriented in the forward and backward directions along the circumference of the feeding channel 130 (i.e. clockwise direction and counterclockwise direction). Moreover, the arris facing the aforementioned first direction may be the sharpest edge in the triangular pyramid, that is, the angle formed by the two adjacent surfaces forming this arris is the smallest angle of the triangular pyramid.

In addition, the radial connecting portion 142 may adopt an arched design with an arched portion along the circumferential direction of the feeding channel 130, so as to provide relatively high structural strength and robustness under the condition of a relative small size of the radial connecting portion 142.

In the second embodiment, further preferably, the seal 24 may be a composite film made of PET (i.e. polyethylene terephthalate) and PE (i.e. polyethylene), or the seal 24 may be a composite film made of PET and PP (i.e. polypropylene). The thickness of the composite film is no less than 0.05 mm. The composite film made of the above-mentioned material is more advantageous than the film made of metal such as aluminum. The film made of such composite materials can provide a certain strength and tenacity of the seal 24, and thus is easier to be folded or curled during the aforementioned rotation operation and is easier to be restricted in the gap between the splitting portions 14 and the inner wall of the feeding container 2.

In addition, according to the second embodiment, the inner diameter of the feeding container 2 is typically no less than 20 mm and no more than 80 mm. Preferably, the inner diameter of the feeding container 2 is no less than 40 mm and no more than 60 mm.

More preferably, the splitting portions 14 are integrally formed with the feeding connector 13 and the top cover 12 and are made of plastic material, and the top cover 12 is fixedly connected to the receiving container body 11. Optionally, only the feeding container body 21 and the feeding connector 13 of the receiving container 1 are connected with each other in a rotatable manner, while the other parts of the feeding system may be assembled in a fixed connection manner or integrally manufactured in an appropriate manner, for example, integrally formed by molding.

The advantage of the multiple splitting portions 14, the feeding connector 13 and the top cover 12 being integrally formed by molding process using plastic material is that the cost for manufacturing those parts is reduced. For the present disclosure, another and a more critical advantage achieved by such design is that, for example, compared to blades made of other materials such as metal, the splitting portions 14 made of plastic material will not undergo undesired chemical reactions such as oxidation reactions when the splitting portions 14 is in contact with the coagulant flows out from the feeding container 2. Thus, rust or damage caused by long-term use can be avoided.

In addition, the above described solution has another advantage. The splitting portions 14 made of plastic material are less sharp than that made of other routine material. Accordingly, the splitting portions 14 can prevent the part of the peripheral edge of the seal 24 remaining connected to the side wall of the feeding channel from being cut by the splitting portion 14 along the periphery of the feeding channel 130 during the last part of the above-mentioned rotation process, and thus prevent the seal 24 from being completely cut and falling off unintentionally, which is undesirable. Such an accidental fall of the seal 24 may occur when an over-sharp blade is used as the splitting portion 14. However, in the preferred embodiment described herein, the splitting portions 14 made of plastic material and the seal 24 with a thickness of no less than 0.05 mm made of the aforementioned composite film, can avoid the risk of said accidental fall of the seal 24.

As shown in FIG. 12A, the top cover 12 is also provided with a vacuum interface 32 and a patient interface 31, wherein the vacuum interface 32 is used to connect a vacuum system to the receiving container 1 for storing liquid medical waste, and the patient interface 32 is used to connect a treatment device suitable for a certain treatment manner to the receiving container 1 via a catheter. In addition, a handle 4 for holding may also be arranged on the top cover 12.

Although the specific embodiments of the present disclosure have been described above, those skilled in the art should understand that these are only examples, and the protection scope of the present disclosure is defined by the appended claims. Those skilled in the art can make various changes or modifications to these embodiments without departing from the principle and essence of the present disclosure, and these changes and modifications all fall within the protection scope of the present disclosure.

What is claimed is:

1. A feeding system for treating liquid medical waste, the feeding system comprising a receiving container for storing liquid medical waste and a feeding container for accommodating a coagulant;

the feeding container comprises a feeding container body, guide slots provided at the circumferential outer side of the lower portion of the feeding container body, an outlet provided at the lower end of the feeding container body, and a seal which seals the outlet;

the receiving container comprises a receiving container body, a top cover provided at the upper end of the receiving container body and covers said upper end, and a feeding connector connected with the top cover, and the feeding connector is provided with a feeding channel communicating with the receiving container body, wherein guide lugs are provided at the side wall of the feeding channel, and the guide lugs are configured for mating with the guide slots and extending into the guide slots, such that the feeding container is rotatably mounted to the feeding channel; characterized in that:

the feeding connector is provided with a plurality of splitting portions for cutting through the seal, which are arranged along the circumference of the feeding channel and are spaced apart from each other by a certain distance;

the guide slots comprise a first translational slot, a skewed slot and a second translational slot, wherein the first translational slot and the second translational slot are parallel to each other, and the first end of the skewed slot is connected with the first translational slot, the second end of the skewed slot is connected with the second translational slot;

wherein when the guide lugs are moving along the first translational slot, the splitting portions are spaced apart from the seal;

when the guide lugs are moving along the skewed slot from the first end to the second end of the skewed slot, the feeding container is guided to move downward such that the splitting portions come into contact with the seal and then pierce the seal;

when the guide lugs are moving along the second translational slot, the splitting portions cut the seal along the circumferential direction of the feeding channel to destruct the seal, such that the coagulant accommodated in the feeding container is enabled to flow into the receiving container body through the outlet;

wherein the number of the splitting portions is at least three, and wherein a pair of adjacent splitting portions are spaced from each other by a first circumferential angle, and the other pairs of adjacent splitting portions are spaced from each other by a second circumferential angle, and a circumferential angle corresponding to the second translational slot equals to a third circumferential angle;

wherein the first circumferential angle is greater than the third circumferential angle and the third circumferential angle is greater than the second circumferential angle, such that when the guide lugs have moved through the entire second translational slot, a majority of the periphery of the seal has been cut by the splitting portions along the circumferential direction of the feeding channel; and wherein when the feeding container is mounted to the feeding channel, there is a radial gap between the circumferential edge of the outlet and the splitting portions, wherein the radial gap is no less than 0.5 mm and no more than 2.0 mm.

2. The feeding system for treating liquid medical waste according to claim 1, wherein the number of the splitting portions is three, the first circumferential angle is about 180°, the second circumferential angle is about 90°.

3. The feeding system for treating liquid medical waste according to claim 1, wherein the radial gap is no less than 0.7 mm and no more than 1.0 mm.

4. The feeding system for treating liquid medical waste according to claim 1, wherein the seal is a composite film made of PET and PE, or a composite film made of PET and PP; and the thickness of the composite film is no less than 0.05 mm.

5. The feeding system for treating liquid medical waste according to claim 1, wherein each splitting portion comprises a blade portion and a radial connecting portion, and the blade portion is connected to the side wall of the feeding channel via the radial connecting portion and is positioned below the guide lugs, wherein the blade portion has a tip extending upward substantially along the extending direction of the feeding channel and a flat surface facing towards the side wall of the feeding channel, the radial distances between the flat surface of the blade portion of each splitting portion and the side wall of the feeding channel are substantially the same.

6. The feeding system for treating liquid medical waste according to claim 5, wherein when the feeding container is guided to rotate in a first direction relative to the receiving container, the feeding container moves downward such that the splitting portions come into contact with the seal and pierce the seal, and the blade portion has a forward cutting edge and a non-sharp back surface, the forward cutting edge is positioned at an upstream position of the non-sharp back surface along the first direction; and, the blade portion has a height along the extending direction of the feeding channel and a width substantially along the circumferential direction of the feeding channel, wherein the height of the blade portion is no less than 4 mm and no more than 16 mm, and the width of the blade portion is no less than 2 mm and no more than 8 mm.

7. The feeding system for treating liquid medical waste according to claim 1, wherein the feeding container body has an inner diameter that is substantially uniform along its height direction.

8. The feeding system for treating liquid medical waste according to claim 7, wherein the inner diameter of the feeding container body is no less than 20 mm and no more than 80 mm, and preferably, no less than 40 mm and no more than 60 mm.

9. The feeding system for treating liquid medical waste according to claim 1, wherein the splitting portions are integrally formed with the feeding connector and the top cover, and are made of plastic material, and the top cover is fixedly connected with the receiving container body.

10. The feeding system for treating liquid medical waste according to claim 1, wherein a lower part of the feeding container body constitutes a neck portion of the feeding container body.

11. The feeding system for treating liquid medical waste according to claim 1, wherein there are two guide lugs and two sets of the guide slots cooperating with the two guide lugs respectively.

12. The feeding system for treating liquid medical waste according to claim 1, wherein the length of the second translational slot exceeds the length of the skewed slot.

13. The feeding system for treating liquid medical waste according to claim 1, wherein the splitting portions are positioned adjacent to the side wall of the feeding channel.

* * * * *